United States Patent [19]

Nomura et al.

[11] Patent Number: 4,738,112
[45] Date of Patent: Apr. 19, 1988

[54] METHOD AND DEVICE FOR CONTROLLING BRAKE BOOSTER SUPPLEMENTARY VACUUM PUMP ENSURING GOOD BOOSTER VACUUM AND LOW PUMP WEAR

[75] Inventors: Yoshihisa Nomura, Toyota; Koichi Suda, Aichi, both of Japan

[73] Assignee: Toyota Jidosha Kabushiki Kaisha, Aichi, Japan

[21] Appl. No.: 904,984

[22] Filed: Sep. 5, 1986

[30] Foreign Application Priority Data

Sep. 10, 1985 [JP] Japan ................ 60-201136

[51] Int. Cl.⁴ .................................. F16D 31/02
[52] U.S. Cl. ............................ 60/721; 60/397;
 60/327; 303/12
[58] Field of Search ............... 303/12, 14; 180/132;
 60/397, 721; 364/426

[56] References Cited

U.S. PATENT DOCUMENTS

| 2,705,870 | 4/1955 | Holton | 303/12 |
| 4,024,709 | 5/1977 | Erdmann | 60/397 |
| 4,224,791 | 9/1980 | Ostwald | 60/397 |

FOREIGN PATENT DOCUMENTS

| 156855 | 9/1984 | Japan | 303/12 |
| 59-164252 | 9/1984 | Japan . | |

OTHER PUBLICATIONS

*Elektronische Getriebesteuerung* by Von Helmut Mohl and Manfred Schwab in *Bosch Techn. Berichte,* Apr. 1983.

Primary Examiner—Edward K. Look
Attorney, Agent, or Firm—Parkhurst & Oliff

[57] ABSTRACT

In the vacuum boosting system for the brake of a vehicle wherein the boosting vacuum is supplied from the intake manifold of the engine and also, as an assistance thereto, from a vacuum pump which is to be occasionally operated when the intake vacuum of the engine is insufficient to boost the brake, the operation of the vacuum pump is controlled in two alternative modes. In the first mode, when the vehicle is running at a relatively high speed with the transmission being shifted to a relatively high speed stage, the vacuum pump is switched on when the brake boosting vacuum has dropped below a first relatively high threshold value to be operated for a first relatively short period so as to recover the vacuum. In the second mode, when the vehicle is running at a relatively low speed and/or the transmission is shifted to a relatively low speed stage, the vacuum pump is switched on when the brake boosting vacuum has dropped below a second threshold value substantially lower than the above-mentioned first threshold value to be operated for a second period which is substantially longer than the above-mentioned first period.

6 Claims, 3 Drawing Sheets

METHOD AND DEVICE FOR CONTROLLING BRAKE BOOSTER SUPPLEMENTARY VACUUM PUMP ENSURING GOOD BOOSTER VACUUM AND LOW PUMP WEAR

BACKGROUND OF THE INVENTION

The present invention relates to a method and a device for controlling a supplementary vacuum pump of the electrical type which is provided for supplementing brake booster vacuum for the braking system of an automotive vehicle, and more particularly relates to such a method and such a device for controlling such a vacuum pump, in which the control is improved so as to ensure good vacuum supply in conditions of high speed vehicle operation, while at the same time minimizing wear on the vacuum pump.

The present invention has been described in Japanese patent application Ser. No. 60-201136 (1985), filed by an applicant the same as the entity assigned or owed duty of assignment of the present patent application; and the present patent application hereby incorporates into itself by reference the text of said Japanese Patent Application and the claim and the drawings thereof; a copy is appended to the present application.

In Japanese Patent Laying Open Publication Ser. No. 59-164252 (1984), which it is not intended hereby to admit as prior art to the present patent application except to the extent in any case required by applicable law, there is disclosed a vacuum operated type of brake booster for the master cylinder of the braking system of an automotive vehicle, which receives a basic or main supply of manifold vacuum from a vacuum take out port provided in the intake system of the internal combustion engine of the vehicle, via a one way check valve, and which also receives a supplemental supply of vacuum from an electrically operated vacuum pump, via a second one way check valve. Thus, the usual type of vacuum supply from the intake system of the vehicle engine is used as the fundamental vacuum supply for the brake booster, but the vacuum pump is also operated so as to provide supplemental vacuum for said brake booster and so as to keep the vacuum value which is being provided for said brake booster at a predetermine vacuum level which is sufficient and appropriate.

However, this type of process and device as mentioned in the above identified proposal are only applicable to a vehicle with an engine that is fitted with an automatic stop device, and not to a conventional type of vehicle. Also, the operation of the pump is not controlled in response to the vacuum value actually present in the brake booster, so that in some circumstances this brake booster vacuum value may undesirably drop to be unacceptably low (close to atmospheric pressure).

The problem is that the force amplification characteristics of such a vacuum operated brake booster depend upon the vacuum value supplied to it, and to maintain suitable force amplification characteristic it is required to maintain the vacuum supplied to the brake booster at a high level and to keep the actual value of said vacuum within fairly tight limits, i.e. between an upper limit and a lower limit which differ from one another only by a relatively small value. However, the vacuum value which is received by the brake booster from the vacuum take out port provided to the intake system of the engine is variable, depending upon the current engine operational conditions, and particularly only has a relatively high value during engine idling or sharp engine braking operational conditions. Therefore, there arises a need to switch the electric vacuum pump on and off frequently, which has a deleterious effect upon the durability and the reliability of the pump.

SUMMARY OF THE INVENTION

The inventors of the present invention have considered the various problems detailed above.

Accordingly, it is the primary object of the present invention to provide a method for controlling such a vacuum pump for providing auxiliary supply of brake booster vacuum for a brake booster of a braking system of an automotive vehicle, which avoids the problems detailed above.

It is a further object of the present invention to provide such a method for controlling such a vacuum pump, which only operates said vacuum pump when it is actually required.

It is a further object of the present invention to provide such a method for controlling such a vacuum pump, which does not operate said vacuum pump unduly.

It is a further object of the present invention to provide such a method for controlling such a vacuum pump, which does not turn said vacuum pump on and off unduly frequently.

It is a further object of the present invention to provide such a method for controlling such a vacuum pump, which maintains the durability and service life of said vacuum pump.

It is a further object of the present invention to provide such a method for controlling such a vacuum pump, which definitely provides a high level of brake booster vacuum when such a high level is definitely required for vehicle safety.

It is a concomitant further object of the present invention to provide a control device for such an auxiliary vacuum pump for such a brake booster system, which implements such methods, so as to achieve at least some of the objects detailed above.

According to the most general method aspect of the present invention these and other objects are attained for a system, for providing vacuum for a brake booster of a vehicle which comprises an internal combustion engine with an intake system providing suction and a transmission which can be set to any one of a plurality of speed stages, comprising: (a) a vacuum take out port provided in said engine intake system; (b) a first vacuum conduit communicating said engine intake system vacuum take out port to said brake booster; (c) a first check valve provided in said first vacuum conduit which allows air to flow through it in the direction from said brake booster towards said vacuum take out port in said vehicle engine intake system but not substantially in the reverse direction; (d) an electrically operated vacuum pump comprising a vacuum outlet at which said pump sucks when operated; (e) a second vacuum conduit connecting said vacuum outlet of said electrically operated vacuum pump to said brake booster; and (f) a second check valve provided in said second vacuum conduit which allows air to flow through it in the direction from said brake booster towards said vacuum outlet of said electrically operated vacuum pump but not substantially in the reverse direction. A method for controlling said electrically operated vacuum pump comprises the steps of: (g) detecting by a vacuum sensing means a parameter representing the value of vacuum that is currently being supplied to said brake booster; (h) detecting by a transmission shift position sensing means whether said transmission is currently shifted to a relatively high speed stage or to a relatively low speed stage; (i) detecting by a vehicle road speed sensing means a parameter representing the current road speed of the vehicle; (j) if the thus detected vehicle current road speed is greater than a determinate threshold road speed value and also the thus detected shift stage of said transmission is a relatively high speed stage, then; (k) if the thus detected value of vacuum that is currently being supplied to said brake booster drops below a first determinate threshold vacuum value, then controlling said electrically operated vacuum pump to operate for a certain first determinate time interval; and: (l) if the thus detected vehicle current road speed is less than said determinate threshold road speed value or the thus detected shift stage of said transmission is a relatively low speed stage, then: (m) if the thus detected value of vacuum that is currently being supplied to said brake booster drops below a second determinate threshold vacuum value which is substantially lower than said first determinate threshold vacuum value, then controlling said electrically operated vacuum pump to operate for a certain second determinate time interval which is substantially longer than said first determinate time interval. According to the most general device aspect of the present invention, these and other objects are attained for a system, for providing vacuum for a brake booster of a vehicle which comprises an internal combustion engine with an intake system providing suction and a transmission which can be set to any one of a plurality of speed stages, comprising: (a) a vacuum take out port provided in said engine intake system; (b) a first vacuum conduit communicating said engine intake system vacuum take out port to said brake booster; (c) a first check valve provided in said first vacuum conduit which allows air to flow through it in the direction from said brake booster towards said vacuum take out port in said vehicle engine intake system but not substantially in the reverse direction; (d) an electrically operated vacuum pump comprising a vacuum outlet at which said pump sucks when operated; (e) a second vacuum conduit connecting said vacuum outlet of said electrically operated vacuum pump to said brake booster; and (f) a second check valve provided in said second vacuum conduit which allows air to flow through it in the direction from said brake booster towards said vacuum outlet of said electrically operated vacuum pump but not substantially in the reverse direction. A control system for said electrically operated vacuum pump comprises: (g) a means for sensing a parameter representing the value of vacuum that is currently being supplied to said brake booster; (h) a means for detecting whether said transmission is currently shifted to a relatively high speed stage or to a relatively low speed stage; (i) a means for sensing a parameter representing the current road speed of the vehicle; (j) a means for, if the vehicle current road speed thus sensed by said road speed sensing means is greater than a determinate threshold road speed value and also the shift stage of said transmission thus detected by said transmission speed stage detecting means is a relatively high speed stage, then: (k) if the value of vacuum that is currently being supplied to said brake booster thus sensed by said vacuum sensing means drops below a first determinate threshold vacuum value, then controlling said electrically operated vacuum pump to operate for a certain first determinate time interval; and: (l) a means for, if the vehicle current road speed thus sensed by said road speed sensing means is less than said determinate threshold road speed value or the shift stage of said transmission thus detected by said transmission speed stage detecting means is a relatively low speed stage, then: (m) if the value of vacuum that is currently being supplied to said brake booster thus sensed by said vacuum sensing means drops below a second determinate threshold vacuum value which is substantially lower than said first determinate threshold vacuum value, then controlling said electrically operated vacuum pump to operate for a certain second determinate time interval which is substantially longer than said first determinate time interval.

According to such a method and such a device as specified above, if the vehicle current road speed as sensed by the road speed sensing means is greater than the determinate threshold road speed value and also the shift stage of the transmission as detected by the transmission speed stage detecting means is a relatively high speed stage, then the system operates in such a manner that, if the value of vacuum that is currently being supplied to the brake booster as sensed by the vacuum sensing means drops below the first determinate threhold vacuum value which is the relatively high one, then the electrically operated vacuum pump is turned on and is operated for the first determinate time interval which is the relatively short one. In this case, the lower limit for the vacuum value being supplied to the brake booster is relatively high, and the difference between the upper brake booster vacuum value limit and the lower brake booster vacuum value limit is relatively low, thus providing exceptionally good and reliable amplification of braking force by the brake booster, as is suitable for relatively high speed vehicle operation. On the other hand, if the vehicle current road speed as sensed by the road speed sensing means is less than the determinate threshold road speed value, or the shift stage of the transmission as detected by the transmission speed stage detecting means is a relatively low speed stage, or both, then the system operates in such a manner that, if the value of vacuum that is currently being supplied to the brake booster as sensed by the vacuum sensing means drops below the second determinate threshold vacuum value which is the relatively low one, then the electrically operated vacuum pump is turned on and is operated for the second determinate time interval which is the relatively long one. In this case, the lower limit for the vacuum value being supplied to the brake booster is relatively low, and the difference between the upper brake booster vacuum value limit and the lower brake booster vacuum value limit is relatively high, thus providing moderate but acceptable amplification of braking force by the brake booster, as is acceptable for relatively high speed vehicle operation, while at the same time reducing the frequency of turning on and off of the vacuum pump, thus benefiting its reliability and its service life.

Further, according to particular specializations of the present invention, the above specified and other objects are more particularly attained by a method and a device for controlling a vacuum pump as specified above, wherein the vacuum value supplied to said brake booster typically reached after operation of said electrically operated vacuum pump for said first time interval from the operational condition at which said vacuum value supplied to said brake booster is substantially equal to said first determinate threshold vacuum value, is substantially equal to the vacuum value supplied to said brake booster typically reached after operation of said electrically operated vacuum pump for said second time interval from the operational condition at which said vacuum value supplied to said brake booster is substantially equal to said second determinate threshold vacuum value or, alternatively, is substantially different therefrom. Each of these operational arrangements may be preferable, depending upon circumstances.

BRIEF DESCRIPTION OF THE DRAWINGS

The present invention will now be described with respect to the preferred embodiment thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and so on in the various figures; and:

DESCRIPTION OF THE PREFERRED EMBODIMENTS

Figure 1:
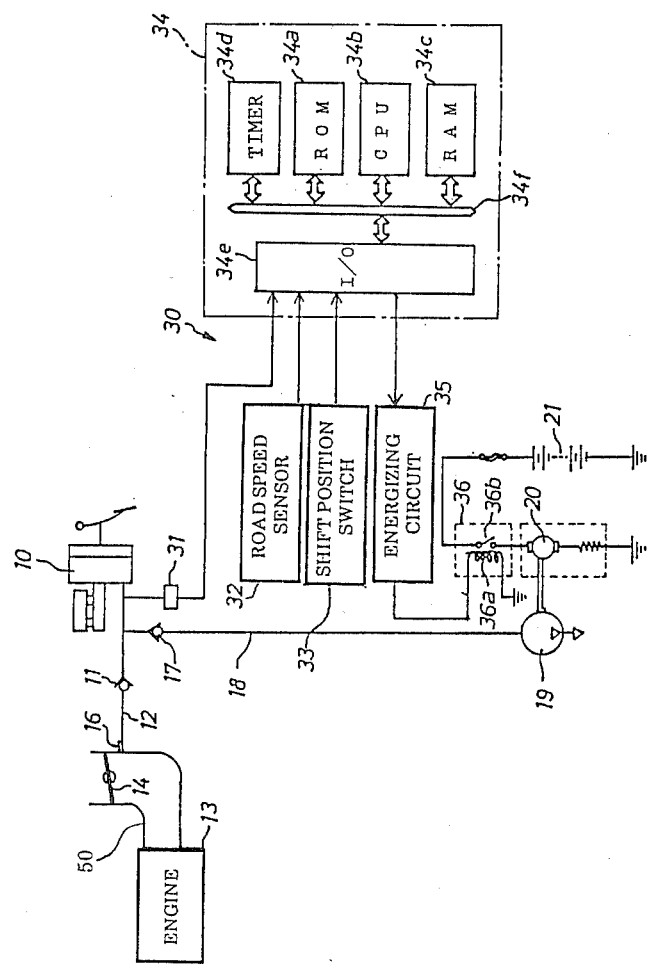
FIG. 1 is a general schematic block diagrammatical view of a vacuum generating system for an automotive vehicle, including a vacuum pump and the preferred embodiment of the device for controlling a vacuum pump of the present invention, which practices the preferred method embodiment.

The present invention will now be described with reference to the preferred embodiments thereof, and with reference to the figures. FIG. 1 shows a general schematic block diagrammatical view of the vacuum generating system for an automotive vehicle, which includes a vacuum pump for supplementing intake manifold vacuum when required, and which includes the preferred embodiment of the device for controlling a vacuum pump of the present invention, said preferred device embodiment practicing the preferred method embodiment.

In detail, this automotive vehicle includes an internal combustion engine 13, which is provided with an intake manifold 50 at an intermediate position in which there is provided a throttle valve 14 of the butterfly valve type. To a vacuum port 16 in said intake manifold 50 which is located at a position which is always downstream of said throttle valve 14 there is connected one end of a vacuum conduit 12, and this vacuum conduit 12 leads, via a one way check valve 11 which allows flow of air through it only in the direction towards the intake manifold 50 but not in the reverse direction, to a per se known type of brake booster 10 for the brake master cylinder of the braking system of the vehicle; these parts are only schematically shown in the figure because they are per se conventional and well understood. Further, from an intermediate position in said vacuum conduit 12 between said brake booster 10 and said one way check valve 11 there branches off another vacuum conduit 18, which leads, via another one way check valve 17 which allows flow of air through it only in the direction away from the brake booster 10 but not in the reverse direction, to an intake port of a vacuum pump 19. Thus, the brake booster 10 is supplied with whichever of the vacuum values is higher: the vacuum value currently being induced in the intake manifold 50 by the internal combustion engine 13, or the vacuum value currently being produced by the vacuum pump 19, if said vacuum pump 19 is currently being operated.

The vacuum pump 19 is driven by the operation of an electric motor 20, which is controlled by a control device 30. In other words, the control device 30 controls the on/off action of the electric motor 20. This control device 30 incorporates a microcomputer 34 which receives input of signals from certain sensors and runs a control program which, based upon the values of said input signals, generates an output signal for controlling the electric motor 20. The signals received by said control device 30 include: a signal representing the current value of the pressure being supplied to the brake booster 10, produced by a pressure sensor 31 fitted to the portion of the vacuum conduit 12 just near to where said vacuum conduit 12 is connected to said brake booster 10; a signal representing the current value of the road speed of the vehicle, produced by a vehicle road speed sensor 32 of a per se known type; a signal representing the current shift position of the transmission of the vehicle, produced by a shift position switch 33 of a per se known sort, fitted to said vehicle transmission (not particularly shown). This last signal may, for example, indicate whether or not a manual transmission, in the event that such a manual type transmission is fitted to this particular vehicle, is currently shifted to its fourth speed or to its fifth speed, or not. And the CPU shown by the block 34b in FIG. 1 of the microcomputer 34 incorporated in this control device 30 operates based upon the aforementioned stored program in its ROM (read only memory) 34a, utilizing its RAM 34c for storing working values and the like, and utilizing a timer 34d as will be explained later and a bus 34f for intercommunicating these various devices, and further inputting the values of the signals from the above described various sensors via an I/O interface 34c, and outputs an ON/OFF control signal via said I/O interface 34e and via an energizing circuit 35 connected thereto to a relay 36, or rather in more detail to a coil 36a incorporated in said relay 36 which when thus energized closes a pair of contacts 36b, thus supplying the energy of the battery 21 of the vehicle of the electric motor 20 so as to operate the vacuum pump 19 and cause it to suck air out from the vacuum conduit 18.

Figure 2:
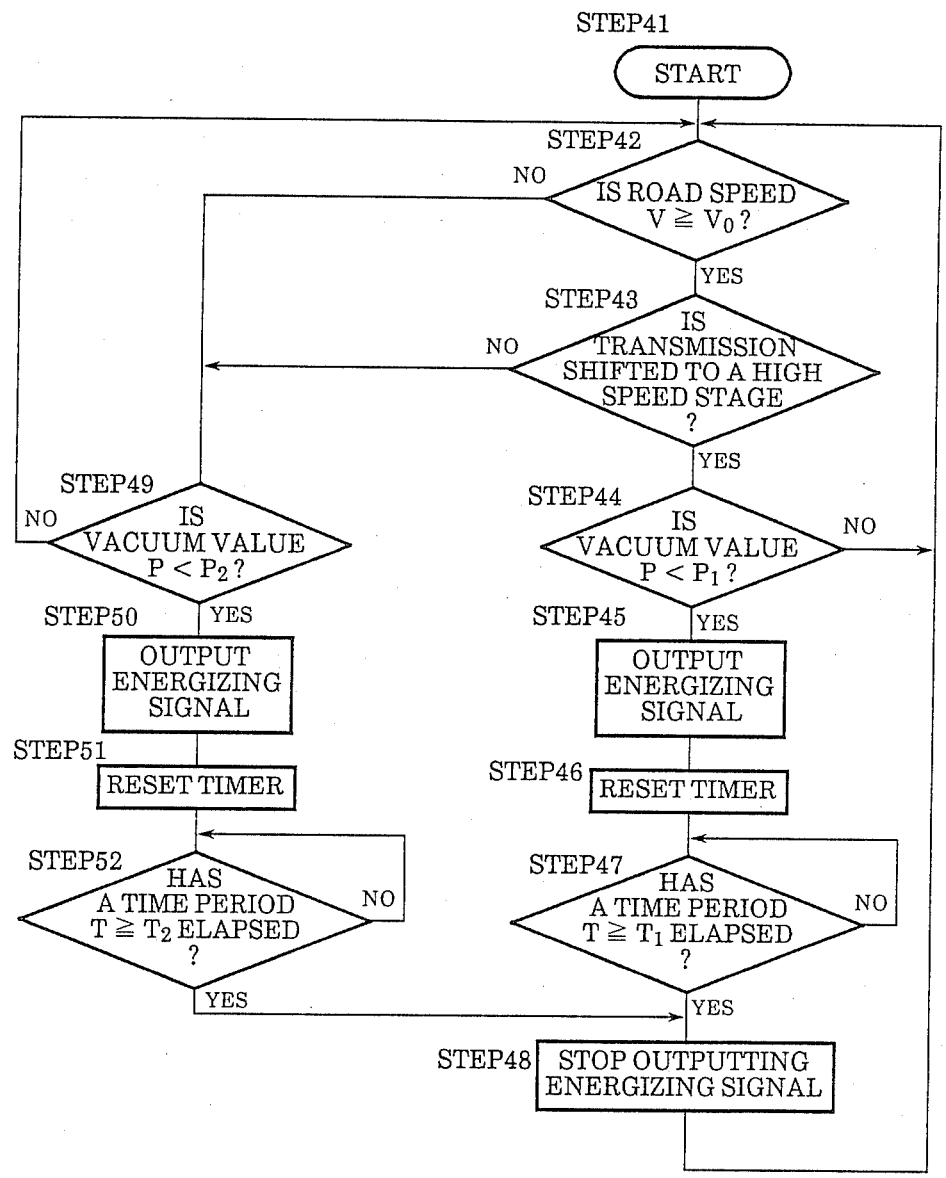
FIG. 2 is a flow chart showing the operation of a control program obeyed by a microcomputer incorporated in said preferred device embodiment, for practicing said preferred method embodiment, for controlling said vacuum pump in either of two operational modes, a first operational mode in which relatively severe control of the vacuum which is being supplied to a brake booster is required, and a second operational mode in which only relatively lax control of said vacuum which is being supplied to a brake booster is required.

Referring now to FIG. 2 which shows a flow chart for the overall operation of said microcomputer 34 incorporated in the control device 30, in a start block 41 the program is started, and then the flow of control proceeds to a decision step 42. In this decision step 42, a decision is made as to whether the current value V of the vehicle road speed, as detected from the output signal value currently being received by the microcomputer 34 from the vehicle road speed sensor 32, is greater than or equal to a determinate road speed value $V_0$, or not. If the answer to this decision is NO, so that currently the vehicle road speed is less than said determinate value $V_0$, then it is deemed that a high degree of vacuum provision for the brake booster 10 is not currently required, and then the flow of control passes next to the decision step 49. On the other hand, if the answer to this decision is YES, so that currently the vehicle road speed is greater than or equal to said determinate value $V_0$, then it is deemed that perhaps a high degree of vacuum provision for the brake booster 10 is currently required, depending upon the outcome of the test of the next decision step, and in this case the flow of control passes next to the decision step 43.

In this decision step 43, a decision is made as to whether the currently shifted position of the transmission of the vehicle, as indicated by the output signal from the shift position switch 33 fitted to said vehicle transmission, is a high speed stage or not. For example, in the case of a five speed manual type transmission, the concept "high speed stage" may be elaborated as meaning "the fourth speed stage or the fifth speed stage". If the answer to this decision is NO, so that the transmission is not currently shifted to a high speed stage, then it is deemed that a high degree of vacuum provision for the brake booster 10 is not currently required, and then the flow of control passes next to the decision step 49, as before from the previous decision step 42. On the other hand, if the answer to this decision is YES, so that the transmission is currently shifted to a high speed stage (as well as the vehicle road speed being greater than or equal to the determinate road speed value $V_0$ as already determined), then it is deemed that a high degree of vacuum provision for the brake booster 10 is definitely currently required, and in this case the flow of control passes next to the decision step 44.

Figure 3:
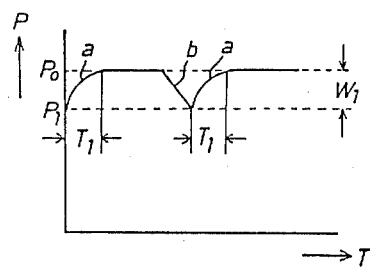
FIG. 3 is a time chart, showing, for the vacuum P being supplied to said brake booster, the behavior of said brake booster vacuum P against time, in said first operational mode of said preferred embodiment of the device for controlling a vacuum pump of the present invention in which relatively severe control of said vacuum P which is being supplied to said brake booster is being provided.

The program branch from this decision step 44 to the decision step 47 inclusive relates to this case in which a high and severely controlled degree of vacuum provision for the brake booster 10 is required, and reference should therefore be made to the time chart of FIG. 3 for said vacuum P being supplied to said brake booster 10, which shows the behavior of said brake booster vacuum P against time.

In this decision step 44, a decision is made as to whether the current value P of the vacuum which is being supplied to the brake booster 10 for the brake master cylinder device is less than a certain first determinate limit value $P_1$, or not (these values are expressed as absolute values of depression below ambient atmospheric pressure, and are positive). If the answer to this decision is NO, so that currently the value of vacuum being supplied to the brake booster 10 is greater than this first determinate limit value $P_1$, then it is deemed that no operation of the vacuum pump 19 is required at this time, since the vacuum value being received by the brake booster 10 is already sufficient for its operation even during these relatively severe operational conditions of high vehicle speed and the vehicle transmission being shift to a high speed stage, and thus the flow of control passes next back to the decision step 42 again, to repeat the cycle described above. On the the other hand, if the answer to this decision is YES, so that currently the value of vacuum being supplied to the brake booster 10 is less than or equal to this first determinate limit value $P_1$, then it is deemed that operation of the vacuum pump 19 is required at this time to provide supplemental vacuum for the brake booster 10, since the vacuum value currently being received by the brake booster 10 is not considered sufficient for its operation during these relatively severe operational conditions of high vehicle speed and the vehicle transmission being shifted to a high speed stage which naturally require a relatively high degree of vacuum to be provided to the brake booster 10 in the interests of good and effective braking and thus of vehicle safe operation, and in this case the flow of control passes next to the step 45. This point of the process corresponds to the start of the time chart of FIG. 3, where the vacuum value P being supplied to the brake booster 10 has just dipped to or just below the value $P_1$.

In this step 45, the CPU 34b outputs, via the I/O interface 34e, an energizing signal for the energizing circuit 35, so as to cause said energizing circuit 35 to energize the relay 36 so as to start the operation of the electric motor 20 from the battery 21 of the vehicle for operating the vacuum pump 19, so that said vacuum pump 19 starts to suck and to generate additional vacuum, which is supplied therefrom through the vacuum conduit 18 and the one way check valve 17 to the brake booster 10. The energizing circuit 35 remembers this energizing signal, and stays set to continue keeping the relay 36 energized, without any further action on the part of the CPU 34b. Next, the flow of control passes to the step 46.

In this step 46, the timer 3d incorporated in the microcomputer 34 is reset, and next the flow of control passes to the decision step 47.

In this decision step 47, a decision is made as to whether the time period T counted by the timer has become greater than or equal to a certain determinate time period value $T_1$, or not. If the answer to this decision is NO, so that a time period $T_1$ has not yet elapsed since the turning on of the timer 34d in the previous step 46, then it is deemed that the vacuum pump 19 has not yet been operated for a sufficiently long time period to properly increase the vacuum value in the brake booster 10, and thus the flow of control passes next to this same decision step 47 again, to cycle around and around in a tight loop until the result of this decision becomes YES. This cycle corresponds to the portion designated as "a" of the FIG. 3 time chart during which the value of the vacuum being provided to the brake booster 10 is steadily rising, under the operation of the vacuum pump 19. On the other hand, if and when the answer to this decision is YES, so that a time period $T_1$ has now elapsed since the turning on of the timer 34d in the step 46, then it is deemed that the vacuum pump 19 has now been operated for a sufficiently long time period to properly increase the vacuum value in the brake booster 10 up to a more suitable level such as the level $P_0$ as shown in the FIG. 3 time chart, and in this case the flow of control passes next to the step 48.

In this step 48, the CPU 34b outputs, via the I/O interface 34e, a deenergizing signal for the energizing circuit 35, so as to cause said energizing circuit 35 to deenergize the relay 36 so as to stop the operation of the electric motor 20 from the battery 21 of the vehicle for operating the vacuum pump 19, so that said vacuum pump 19 now stops sucking and generating additional vacuum and supplying it to the brake booster 10. As before, the energizing circuit 35 remembers this deenergizing signal, and stays set to continue keeping the relay 36 deenergized, without any further action on the part of the CPU 34b. Next, the flow of control passes back to the step 42 again, to cycle round through this program again.

And, in this cycle, so long as the value of the vacuum in the brake booster 10 remains substantially constant, as shown by the flat portion in the FIG. 3 time chart, or drops as for example by braking action as shown by the dropping portion designated as "b" in said FIG. 3 time chart but has not yet reached the determinate value $P_1$, the flow of control takes the NO branch from the decision step 44 every time, so that the vacuum pump 19 is not further actuated; but, on the other hand, when the value of the vacuum in said brake booster 10 drops as for example by braking action or by leakage of the one way check valve 11 or the one way check valve 17 below said determinate value $P_1$, then the flow of control takes the YES branch from the decision step 44 again, so that this process is repeated. Thus, as a summary, the value of the vacuum which is being supplied to said brake booster 10, in this relatively severe operational mode in which the vehicle speed is higher than the value $V_0$ and also the vehicle transmission is shifted to a high speed stage which naturally requires a relatively high degree of vacuum to be provided to the brake booster 10, fluctuates as shown by the FIG. 3 flow chart between the lower threshold value P1 and a higher value $P_0$ which is reached by operating the vacuum pump 19 for the determinate time interval $T_1$ from the $P_0$ vacuum condition.

Figure 4:
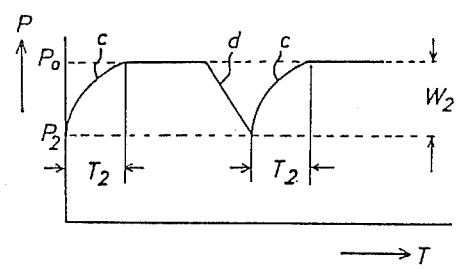
FIG. 4 is another time chart, similar to FIG. 3, showing, for said vacuum P being supplied to said brake booster, the behavior of said brake booster vacuum P against time, in said second operational mode of said preferred embodiment of the device for controlling a vacuum pump of the present invention in which relatively lax control of said vacuum P which is being supplied to said brake booster is being provided.

On the other hand, the other branch of this program from the decision step 49 to the decision step 42 inclusive relates to the other case in which a relatively lower and less severely or more laxly controlled degree of vacuum provision for the brake booster 10 is required, and reference should therefore be made to the time chart of FIG. 4 for said vacuum P being supplied to said brake booster 10, which shows the behavior of said brake booster vacuum P against time in this operational case.

In this decision step 49, a decision is made as to whether the current value P of the vacuum which is being supplied to the brake booster 10 for the brake master cylinder device is less than a certain first determinate limit value $P_2$, or not. Again, these values are expressed as absolute values of depression below ambient atmospheric pressure, and are positive; and this determinate pressure limit value $P_2$ may desirably be set to be substantially below the previously utilized determined pressure limit value $P_1$. If the answer to this decision is NO, so that currently the value of vacuum being supplied to the brake booster 10 is greater than this first determinate limit value $P_2$, then it is deemed that no operation of the vacuum pump 19 is required at this time, since the vacuum value being received by the brake booster 10 is already sufficient for its operation during these relatively lax operational conditions of lower vehicle speed and/or the vehicle transmission being shifted to a lower speed stage, and thus the flow of control passes next back to the decision step 42 again, to repeat the cycle described above. On the other hand, if the answer to this decision is YES, so that currently the value of vacuum being supplied to the brake booster 10 is less than or equal to this second determinate limit value $P_2$, then it is deemed that operation of the vacuum pump 19 is required at this time to provide supplemental vacuum for the brake booster 10, since the vacuum value currently being received by the brake booster 10 is not considered sufficient for its operation even during these relatively lax operational conditions of low vehicle speed and/or the vehicle transmission being shifted to a relatively low speed stage which do not require quite such a high degree of vacuum as heretofore to be necessarily provided to the brake booster 10, considering the operational desirability balance with wear and tear on the vacuum pump 19 and so forth, and in this case the flow of control passes to the step 50. This point of the process corresponds to the start of the time chart of FIG. 4, where the vacuum value P being applied to the brake booster 10 has just dipped to or just below the value $P_2$.

In this step 50, the CPU 34b outputs, via the I/O interface 34e, an energizing signal for the energizing circuit 35, so as to cause said energizing circuit 35 to energize the relay 36 so as to start the operation of the electric motor 20 form the battery 21 of the vehicle for operating the vacuum pump 19, so that said vacuum pump 19 starts to suck and to generate additional vacuum, which is supplied therefrom through the vacuum conduit 18 and the one way check valve 17 to the brake booster 10. The energizing circuit 35 remembers this energizing signal, and stays set to continue keeping the relay 36 energized, without any further action on the part of the CPU 34b. Next, the flow of control passes to the step 51.

In this step 51, the timer 34d incorporated in the microcomputer 34 is reset, and next the flow of control passes to the decision step 52.

In this decision step 52, a decision is made as to whether the time period T counted by the timer has become greater than or equal to a certain determinate time period value $T_2$, or not. This time period $T_2$ may be typically and desirably set to be substantially longer than the previously utilized time period $T_1$. If the answer to this decision is NO, so that a time period $T_2$ has not yet elapsed since the turning on of the timer 34d in the previous step 51, then it is deemed that the vacuum pump 19 has not yet been operated for a sufficiently long time period to properly increase the vacuum value in the brake booster 10, and thus the flow of control passes next to this same decision step 52 again, to cycle around and around in a tight loop until the result of this decision becomes YES. This cycle corresponds to the portion designated as "c" of the FIG. 4 time chart during which the value of the vacuum being provided to the brake booster 10 is steadily rising, under the operation of the vacuum pump 19. On the other hand, if and when the answer to this decision is YES, so that a time period $T_2$ has now elapsed since the turning on of the timer 34d in the step 51, then it is deemed that the vacuum pump 19 has now been operated for a sufficiently long time period to properly increase the vacuum value in the brake booster 10 up to a more suitable level such as the level $P_0$ as shown in the FIG. 4 time chart (this level $P_0$ is exemplarily the same as the level $P_0$ in the case of the FIG. 3 time chart, but this is not intended to be limitative of the present invention), and in this case the flow of control passes next to the step 48.

As before, in this step 48, the CPU 34b outputs, via the I/O interface 34e, a deenergizing signal for the energizing circuit 35, so as to cause said energizing circuit 35 to deenergize the relay 36 so as to stop the operation of the electric motor 20 from the battery 21 of the vehicle for operating the vacuum pump 19, so that said vacuum pump 19 now stops sucking and generating additional vacuum and supplying it to the brake booster 10. As before, the energizing circuit 35 remembers this deenergizing signal, and stays set to continue keeping the relay 36 deenergized, without any further action on the part of the CPU 34b. Next, the flow of control passes back to the step 42 again, to cycle round through this program again.

Thus, in this cycle, so long as the value of the vacuum in the brake booster 10 remains substantially constant, as shown by the flat portion in the FIG. 4 time chart, or drops as for example by braking action as shown by the dropping portion designated as "d" in said FIG. 4 time chart, but has not yet reached the determinate value $P_2$, the flow of control takes the NO branch from the decision step 49 every time, so that the vacuum pump 19 is not further actuated; but, on the other hand, when the value of the vacuum in said brake booster 10 drops as for example by braking action or by leakage of the one way check valve 11 or the one way check valve 17 below said determinate value $P_2$, then the flow of control takes the YES branch from the decision step 49 again, so that this process is repeated. Thus, as a summary, the value of the vacuum which is being supplied to said brake booster 10, in this relatively lax operational mode in which the vehicle speed is lower than the value $V_0$ and/or the vehicle transmission is shifted to a low speed stage so that only a relatively low or laxly controlled degree of vacuum is required to be provided to the brake booster 10, fluctuates as shown by the FIG. 4 flow chart between the lower threshold value $P_2$ and a higher value exemplarily taken also as equal to $P_0$ which is reached by operating the vacuum pump 19 for the determinate time interval $T_2$ from the $P_0$ vacuum condition.

Thus, the effect of this operation of the microcomputer 34 according to the FIG. 2 flow chart is to determine which of two mutually exclusive and exhaustive combinations of operatinoal circumstances is present. The one such operational circumstance (a) is that both the vehicle speed V is greater than or equal to the determinate threshold speed value $V_0$, and also the transmission of the vehicle is shifted to a high speed stage. On the other hand, the other such operational circumstance (b) is that either the vehicle speed V is less than said determinate threshold speed value $V_0$ and/or the transmission of the vehicle is shifted to a relatively low speed stage.

In the first case (a), the behavior of the pressure P in the brake booster 10 varies as shown by the time chart of FIG. 3, and, after first starting at the value $P_0$ and then dropping therefrom as far as the value $P_1$ as shown by the portion "b" of the time chart, which can occur either because the vehicle brakes have been used to a considerable extent or because of the leakage from the one way check valve 11 or the one way check valve 17 or the like, is caused to rise up by operation of the vacuum pump 19 over a time period $T_1$ as shown by the portion "a" of the time chart, to again reach the value $P_0$. On the other hand, if the brake booster 10 is used while the vacuum pump 19 is thus being operated, then perhaps the pressure P will not rise up as high as the value $P_0$. In any case, the lower limit of the vacuum value supplied to the brake booster 10 is relatively high, being the value $P_1$, and the difference $W_1$ between this lower limit $P_1$ and the upper pressure limit $P_0$ is relatively small, as shown in FIG. 3, thereby maintaining high amplification performance for braking force provided by the brake booster 10.

On the other hand, in the second case (b), the behavior of the pressure P in the brake booster 10 varies as shown by the other time chart of FIG. 4, and, after first starting at the value $P_0$ and then dropping therefrom as far as the value $P_2$ as shown by the portion "d" of the time chart, which can occur either because the vehicle brakes have been used to a considerable extent or because of leakage from the one way check valve 11 or the one way check valve 17 or the like, is caused to rise up by operation of the vacuum pump 19 over a time period $T_2$ as shown by the portion "c" of the time chart, to again reach the value $P_0$. On the other hand, if the brake booster 10 is used while the vacuum pump 19 is thus being operated, then perhaps the pressure P will not rise up as high as the value $P_0$. In any case, the lower limit of the vacuum value supplied to the brake booster 10 is relatively low, being the value $P_2$ which is less than the previous value $P_1$, and the difference $W_2$ between this lower limit $P_2$ and the upper pressure limit $P_0$ is relatively large and is greater than the previous such difference $W_1$, as shown in FIG. 4, thereby maintaining relatively low and in fact normal amplification performance for braking force provided by the brake booster 10. This level can be suitably set by adjusting the value of the threshold pressure level $P_2$. The amount of on and off switching of the vacuum pump 19 is diminished in this case (b) as compared with the previous case (a). This is because there are cases in which the pressure P may drop below the value $P_1$ but, even when the vacuum pump 19 is not operated, may not further drop to be below the value $P_2$, but may instead be restored by sucking from the intake manifold 50.

Therefore, the present invention provides high level brake booster operation during medium and fast vehicle driving operation, when high performance from the power brake system of the vehicle is absolutely required from the point of view of vehicle safety; but on the contrary, during other vehicle operational circumstances only normal level brake booster operation is provided, and the vacuum pump 19 is switched on and off less frequently, thus increasing the reliability of said vacuum pump 19 and its expected service life.

Although the present invention has been shown and described in terms of the preferred embodiments of the method and of the device thereof, and with reference to the appended drawings, it should not be considered as being particularly limited thereby, since the details of any particular embodiment, or of the drawings, could be varied without, in many cases, departing from the ambit of the present invention. For example, although the upper limit for the pressure provided to the brake booster was set to be the value $P_0$ in both the operational cases illustrated by the two drawings of FIG. 3 and FIG. 4, in other possible embodiments these values could be set to be different. Other modifications could also be conceived of. Accordingly, the scope of the present invention is to be considered as being delimited, not by any particular perhaps entirely fortuitous details of the disclosed preferred embodiments, or of the draings, but solely by the scope of the accompanying claims, which follow.

What is claimed is:

1. For a system, for providing vacuum for a brake booster of a vehicle which comprises an internal combustion engine with an intake system providing suction and a transmission which can be set to any one of a plurality of speed stages, comprising:
   (a) a vacuum take out port provided in said engine intake system;
   (b) a first vacuum conduit communicating said engine intake system vacuum take out port to said brake booster;
   (c) a first check valve provided in said first vacuum conduit which allows air to flow through it in the direction from said brake booster towards said vacuum take out port in said vehicle engine intake system but not substantially in the reverse direction;
   (d) an electrically operated vacuum pump comprising a vacuum outlet at which said pump sucks when operated;
   (e) a second vacuum conduit connecting said vacuum outlet of said electrically operated vacuum pump to said brake booster; and
   (f) a second check valve provided in said second vacuum conduit which allows air to flow through it in the direction from said brake booster towards said vacuum outlet of said electrically operated vacuum pump but not substantially in the reverse direction; a method for controlling said electrically operated vacuum pump comprising the steps of:
   (g) detecting by a vacuum sensing means a parameter representing the value of vacuum that is currently being supplied to said brake booster;
   (h) detecting by a transmission shift position sensing means whether said transmission is currently shifted to a relatively high speed stage or to a relatively low speed stage;
   (i) detecting by a vehicle road speed sensing means a parameter representing the current road speed of the vehicle;
   (j) discriminating between a first vehicle operating condition that the thus detected vehicle current road speed is greater than a determinate threshold road speed value and also the thus detected shift stage of said transmission is a relatively high speed stage and a second vehicle operating condition that the thus detected vehicle current road speed is not greater than said determinate threshold road speed value and/or the thus detected shift stage of said transmission is not said relatively high speed stage;
   (j-1) under said first vehicle operating condition, allowing the thus detected vacuum to drop to a first determinate threshold vacuum value without operating said vacuum pump, and when said vacuum has dropped below said first determinate threshold vacuum value, operating said vacuum pump for a certain first determinate period; and
   (j-2) under said second vehicle operating condition, allowing the thus detected vacuum to drop to a second determinate threshold vacuum value which is substantially lower than said first determinate threshold vacuum value without operating said vacuum pump, and when said vacuum has dropped below said second determinate threshold vacuum value, operating said vacuum pump for a certain second determinate period which is substantially longer than said first period.

2. A method for controlling a vacuum pump according to claim 1, wherein the vacuum value supplied to said brake booster typically reached after operation of said electrically operated vacuum pump for said first time interval from the operational condition at which said vacuum valued supplied to said brake booster is substantially equal to said first determinate threshold vacuum value, is substantially equal to the vacuum value supplied to said brake booster typically reached after operation of said electrically operated vacuum pump for said second time interval from the operational condition at which said vacuum value supplied to said brake booster is substantially equal to said second determinate threshold vacuum value.

3. A method for controlling a vacuum pump according to claim 1, wherein the vacuum value supplied to said brake booster typically reached after operation of said electrically operated vacuum pump for said first time interval from the operational condition at which said vacuum value supplied to said brake booster is substantially equal to said first determinate threshold vacuum value, is substantially different from the vacuum value supplied to said brake booster typically reached after operation of said electrically operated vacuum pump for said second time interval from the operational condition at which said vacuum value supplied to said brake booster is substantially equal to said second determinate threshold vacuum value.

4. For a system, for providing vacuum for a brake booster of a vehicle which comprises an internal combustion engine with an intake system providing suction and a transmission which can be set to any one of a plurality of speed stages, comprising:
   (a) a vacuum take out port provided in said engine intake system;
   (b) a first vacuum conduit communicating said engine intake system vacuum take out port to said brake booster;
   (c) a first check value provided in said first vacuum conduit which allows air to flow through it in the direction from said brake booster towards said vacuum take out port in said vehicle engine intake system but not substantially in the reverse direction;
   (d) an electrically operated vacuum pump comprising a vacuum outlet at which said pump sucks when operated;
   (e) a second vacuum conduit connecting said vacuum outlet of said electrically operated vacuum pump to said brake booster; and
   (f) a second check valve provided in said second vacuum conduit which allows air to flow through it in the direction from said brake booster towards said vacuum outlet of said electrically operated vacuum pump but not substantially in the reverse direction; a control system for said electrically operated vacuum pump, comprising:
   (g) a means for sensing a parameter representing the value of vacuum that is currently being supplied to said brake booster;
   (h) a means for detecting whether said transmission is currently shifted to a relatively high speed stage or to a relatively low speed stage;
   (i) a means for sensing a parameter representing the current road speed of the vehicle;

(j) a means for discriminating between a first vehicle operating condition that the vehicle current road speed thus sensed by said road speed sensing means is greater than a determinate threshold road speed value and also the shift stage of said transmission thus detected by said transmission speed stage detecting means is a relatively high speed stage and a second vehicle operating condition that the vehicle current road speed thus sensed by said road speed sensing means is not greater than said determinate threshold road speed value and/or the shift stage of said transmission thus detected by said transmission speed stage detecting means is not said relatively high speed stage; and (k) a means for controlling operation of said vacuum pump so as, under said first vehicle operating condition, to operate said vacuum pump for a certain first determinate period when the vacuum thus sensed by said vacuum representing parameter sensing means has dropped below a first determinate threshold vacuum value, and, under said second vehicle operating condition, to operate said vacuum pump for a certain second determinate period which is substantially longer than said first period when the vacuum thus sensed by said vacuum representing parameter sensing means has dropped below a second determinate threshold vacuum value which is substantially lower than said first determinate threshold vacuum value.

5. A control system according to claim 4, wherein the vacuum value supplied to said brake booster typically reached after operation of said electrically operated vacuum pump for said first time interval from the operational condition at which said vacuum value supplied to said brake booster is substantially equal to said first determinate threshold vacuum value, is substantially equal to the vacuum value supplied to said brake booster typically reached after operation of said electrically operated vacuum pump for said second time interval from the operational condition at which said vacuum value supplied to said brake booster is substantially equal to said second determinate threshold vacuum value.

6. A control system according to claim 4, wherein the vacuum value supplied to said booster typically reach after operation of said electrically operated vacuum pump for said first time interval from the operational condition at which said vacuum value supplied to said brake booster is substantially equal to said first determinate threshold vacuum value, is substantially different from the vacuum value supplied to said brake booster typically reached after operation of said electrically operated vacuum pump for said second timer interval from the operational condition at which said vacuum value supplied to said brake booster is substantially equal to said second determinate threshold vacuum value.

* * * * *